United States Patent Office 2,947,731
Patented Aug. 2, 1960

2,947,731

VINYLBENZYL THIOLESTERS OF CARBOXYLIC ACIDS AND POLYMERS THEREOF

William R. Nummy, Midland, Mich., assignor to The Dow Chemical Company, Midland, Mich., a corporation of Delaware No Drawing. Filed Apr. 4, 1957, Ser. No. 650,569

12 Claims. (Cl. 260—79.7)

This invention concerns certain new vinylbenzyl thiolesters of carboxylic acids. It relates more particularly to such polymerizable organic sulfur-containing esters and polymers thereof and pertains to a method of making the same.

It is an object of the invention to provide new polymerizable organic sulfur-containing vinylbenzyl thiolesters of carboxylic acids. Another object is to prepare new polymers of vinylbenzyl thiolesters of organic thioacids. Still another object is to provide a process for making vinylbenzyl thiolesters of carboxylic acids. A further object is to provide a process for making polymers of vinylbenzyl thiolesters of carboxylic thioacids and vinyl or vinylidene compounds. Other and related objects will appear from the following description of the invention.

According to the invention the foregoing and related objects are obtained by reacting vinylbenzyl chloride with a carbothiolic acid to form the corresponding vinylbenzyl thiolester and polymerizing the monoethylenically unsaturated sulfur-containing ester, as hereinafter described.

In accordance with the invention a vinylbenzyl thiolester of an organic carbothiolic acid is prepared by reacting vinylbenzyl chloride with an alkali metal salt of a carbothiolic acid such as thioacetic acid, thiopropionic acid, thiobutyric acid, thioisobutyric acid, thiohexanoic acid, thiolbenzoic acid or thiooctadecanoic acid.

The reactants can be employed in any desired proportions, but are usually employed in stoichiometric or substantially stoichiometric proportions.

The reaction is usually carried out while having the reactants dissolved, or suspended, in a substantially anhydrous organic liquid reaction medium such as a lower aliphatic alcohol, e.g. methyl alcohol, ethyl alcohol, propyl alcohol, isopropyl alcohol, butyl alcohol, isobutyl alcohol, or an aromatic hydrocarbon such as benzene, toluene, xylene, ethylbenzene, or mixtures of such organic compounds, and at temperatures between 25° and 125° C., preferably from 40° to 100° C., and at atmospheric pressure or thereabout, although superatmospheric pressures may be used.

The vinylbenzyl thiolesters have the general formula

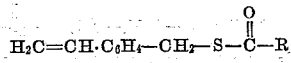

wherein R is a member of the group consisting of the phenyl radical and alkyl radicals containing from 1 to 17 carbon atoms.

In practice, an alkali metal hydroxide such as sodium hydroxide, potassium hydroxide or lithium hydroxide, is dissolved or suspended in finely divided form in a suitable organic liquid, e.g. methyl alcohol or toluene, as reaction medium. Thereafter, a carbothiolic acid, e.g. thioacetic acid, is added in the desired proportion, suitably in amount chemically equivalent to the alkali metal hydroxide, thereby forming the corresponding alkali metal salt of the carbothiolic acid. Vinylbenzyl chloride is added, suitably portionwise or gradually, at about the rate it is consumed in the reaction while at the same time the mixture is agitated or stirred and maintained at reaction temperatures within the range of from 25° to 125° C. The mixture is usually stirred and heated for a short time, e.g. from 0.5 to 2 hours, after addition of the vinylbenzyl chloride to complete the reaction. Alkali metal salt usually precipitates during the reaction. The liquid is separated from the salt in usual ways, e.g. by filtering. The filtrate is subjected to distillation to distill and recover the product, i.e. the vinylbenzyl thiolester.

The vinylbenzyl thiolesters of the invention readily polymerize to form hard viscous products which are soluble in usual organic solvents such as benzene, toluene, methyl ethyl ketone, ethylene dichloride, etc. The polymerization can be carried out in bulk or while having the monomers suspended in an inert liquid medium, e.g. in aqueous emulsion, or brine and in the presence of polymerization catalysts such as benzoyl peroxide, lauroyl peroxide, cumene hydroperoxide, diisopropyl benzene hydroxide, sodium persulfate, potassium persulfate, alpha, alpha-azobisisobutyronitrile, etc.

The vinylbenzyl thiolesters can also be copolymerized with other unsaturated vinyl and vinylidene compounds such as styrene, methylmethacrylate, methyl isopropenyl ketone, etc., to yield copolymers.

The vinylbenzyl thiolesters can be hydrolyzed to form the corresponding vinylbenzyl thiol. The latter compound can be oxidized in usual ways, e.g. by treatment with oxygen to form bis-(vinylbenzyl sulfide) of the formula

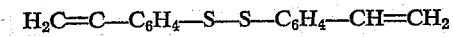

Homopolymers or copolymers of one or more of the vinylbenzyl thiolesters can be hydrolyzed or alcoholized, e.g. by reaction with an alcoholic solution or mixture of an alkali metal hydroxide and a lower aliphatic alcohol such as methyl alcohol, ethyl alcohol or isopropyl alcohol at temperatures between 50° and 120° C., to form polymeric products containing vinylbenzyl thiol in chemically combined form. The alkali salts of the polymeric vinylbenzyl thiol are soluble in aqueous solutions and can be employed as thickening agents for aqueous solutions or suspensions of finely divided material. Such soluble polymeric products can also be oxidized, e.g. by treatment with oxygen or an aqueous solution of Ca(OCl)$_2$ to yield insoluble polymeric products containing —SS— linkages between the polymer chains.

The following examples illustrate ways in which the principle of the invention has been applied, but are not to be construed as limiting its scope.

Example 1

A charge of 1000 cc. of methyl alcohol and 85 grams of potassium hydroxide was placed in a glass reaction vessel equipped with a reflux condenser and stirrer. The mixture was stirred and heated to 60° C. A charge of 105 grams of thioacetic acid was added slowly over a period of one hour. Thereafter, 200 grams of vinylbenzyl chloride (a mixture of approximately 30 percent by weight of ortho-vinylbenzyl chloride and 70 percent para-vinylbenzyl chloride) was added over a period of about one hour while stirring and maintaining the mixture at temperatures between 60° and 64° C. The resulting mixture was stirred and heated at refluxing temperatures for a period of 2 hours, then cooled and filtered to separate the sodium chloride. The liquid filtrate was distilled. There was obtained 172 grams of vinylbenzyl thiolacetate as a yellow liquid. This product was redistilled to yield vinylbenzyl thiolacetate boiling at 95° C. at 0.5 millimeter absolute pressure. The product contained 17.26 percent by weight of sulfur, by analysis. Vinylbenzyl thiolacetate has the formula $$H_2C{=}CH{-}C_6H_4{-}CH_2{-}S{-}\overset{\overset{O}{\|}}{C}{-}CH_3$$

Example 2

A charge of 24 grams of the vinylbenzyl thiolacetate prepared in Example 1 was dissolved in 300 cc. of a 10 weight percent solution of potassium hydroxide in methyl alcohol. The solution was heated at temperatures between 60° and 64° C. under reflux while bubbling nitrogen gas through the same over a period of 2 hours. Thereafter, the solution was mixed with 1500 cc. of water and 200 cc. of toluene, then allowed to stand. The aqueous and organic layers were separated. The toluene layer was discarded. The aqueous layer was acidified with concentrated aqueous hydrochloric acid solution, then was extracted with two 250 cc. portions of toluene. The toluene extracts were combined, dried and heated under reduced pressure to remove the toluene. The residue was distilled. There was obtained 8 grams of vinylbenzyl thiol as a pale yellow liquid. It was analyzed and found to contain 21.67 percent by weight of sulfur. Vinylbenzyl thiol has the formula $$H_2C{=}CH{-}C_6H_4{-}CH_2SH$$

Example 3

A charge of 10 grams of the vinylbenzyl thiolacetate boiling at a temperature of 95° C. at 0.5 millimeter, prepared in Example 1, was placed in a glass tube, together with 0.01 gram of alpha,alpha-azobisisobutyronitrile as polymerization catalyst. The tube was swept out with nitrogen gas, was cooled and sealed. The tube and its contents were heated at a temperature of 100° C. for a period of 4 days to polymerize the vinylbenzyl thiolacetate, then cooled to room temperature. The tube was broken and the product removed. The product was a tough leathery solid. It was dissolved in methyl ethyl ketone. The solution was poured into methyl alcohol to precipitate the polymer. There was obtained 5 grams of polymerized vinylbenzyl thiolacetate as a hard yellow colored solid product. The polymer contained 16.66 percent by weight of sulfur.

Example 4

A mixture of one gram of the polymerized vinylbenzyl thiolacetate prepared in Example 3, and 50 cc. of a 10 weight percent solution of potassium hydroxide dissolved in methyl alcohol was placed in a glass reaction vessel equipped with a reflux condenser. The mixture was heated at refluxing temperatures, about 60°–65° C. for a period of 20 minutes while bubbling a slow stream of nitrogen gas through the same, then was cooled to room temperature and was filtered. The filtrate was diluted with twice its volume of water. A clear solution was obtained. The solution was acidified with aqueous concentrated hydrochloric acid solution. A white precipitate was obtained. It was separated by filtering and was washed with water and dried. There was obtained 0.8 gram of a brown solid. It was soluble in an aqueous 5 weight percent solution of sodium hydroxide. An aqueous alkaline solution of the brown solid can be oxidized by treatment with hydrogen peroxide or an aqueous solution of calcium hypochlorite to form a gel.

Example 5

A charge of 9 grams of styrene and 1 gram of the vinylbenzyl thiolacetate prepared in Example 1, together with 0.05 gram of alpha,alpha-azobisisobutyronitrile, was sealed in a glass ampoule. The mixture was heated at a temperature of 80° C. for a period of 19 hours, then cooled. The tube was broken and the polymer removed. The product was dissolved in methyl ethyl ketone and was then precipitated with methyl alcohol. There was obtained 8 grams of a hard polymeric product. It was crushed to a granular form and was analyzed. The polymer contained 12.6 percent by weight of chemically combined vinylbenzyl thiolacetate.

Example 6

A charge of 9 grams of methyl acrylate and 1 gram of the vinylbenzyl thiolacetate prepared in Example 1 was sealed in a glass tube, together with 0.05 gram of azobisisobutyronitrile, and polymerized by heating the same at a temperature of 80° C. for a period of 3 hours. The polymer was recovered by dissolving the contents of the tube in methyl ethyl ketone, precipitating the polymer with methyl alcohol, separating and drying the same. There was obtained 3 grams of a soft rubberlike polymer.

As previously stated the vinylbenzyl thiolesters can be hydrolyzed to form vinylbenzyl thiol or polymerized to form solid products which are soluble in organic solvents, e.g. toluene, methyl ethyl ketone, ethylene dichloride, etc., or copolymerized with other unsaturated vinyl or vinylidene compounds such as styrene, methyl methacrylate, methyl isopropenyl ketone, etc., to yield resinous products. The vinylbenzyl thiolesters are useful in preparing such other products. The new polymers and copolymers are thermoplastic resins which can be extruded or molded in usual ways employing conventional procedures to form shaped articles such as boxes, plates or plastic tags. They can be incorporated with other resinous polymers to form compositions useful for making shaped articles, e.g. cups, tags, rings, etc.

Small amounts of additives such as plasticizers, lubricants, stabilizers, dyes, pigments, fillers, etc., can be incorporated with the polymers if desired, but the use of such additives is not required.

I claim:

1. A method of making a vinylbenzyl thiolester having the general formula $$H_2C{=}CH{-}C_6H_4{-}CH_2{-}S{-}\overset{\overset{O}{\|}}{C}{-}R$$

wherein R is a member of the group consisting of the phenyl radical and alkyl radicals containing from 1 to 17 carbon atoms, which method comprises reacting approximately equimolecular proportions of vinylbenzyl chloride and an alkali metal salt of a thioacid having the general formula:

$$HS{-}\overset{\overset{O}{\|}}{C}{-}R$$

wherein R has the meaning defined above, at temperatures between 25° and 120° C. while having the reactants dispersed in a substantially anhydrous inert organic liquid.

2. A method as claimed in claim 1, wherein the inert organic liquid is a lower aliphatic alcohol.

3. A method of making vinylbenzyl thiolacetate which method comprises reacting approximately equimolecular proportions of vinylbenzyl chloride and an alkali metal thioacetate at temperatures between 25° and 120° C. while having the reactants dispersed in a substantially anhydrous inert organic liquid.

4. A vinylbenzyl thiolester having the general formula:

$$H_2C{=}CH{-}C_6H_4{-}CH_2{-}S{-}\overset{\overset{O}{\|}}{C}{-}R$$

wherein R is a member of the group consisting of the phenyl radical and alkyl radicals containing from 1 to 17 carbon atoms.

5. Vinylbenzyl thiolacetate having the empirical formula:

$$H_2C{=}CH{-}C_6H_4{-}CH_2{-}S{-}\overset{\overset{O}{\|}}{C}{-}CH_3$$

6. A homopolymer of vinylbenzyl thiolacetate.

7. A copolymer of vinylbenzyl thiolacetate and styrene.

8. A copolymer of vinylbenzyl thiolacetate and methyl acrylate.

9. A method of making a polymer containing vinylbenzyl thiol chemically combined in the polymer molecule, which method comprises hydrolyzing a polymer of a vinylbenzyl thiolester having the general formula:

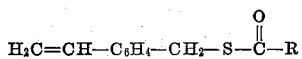

wherein R is a member of the group consisting of the phenyl radical and alkyl radicals containing from 1 to 17 carbon atoms, by heating said polymer thiolester-containing polymer at temperatures between 50° and 120° C. in admixture with an alkali metal hydroxide while having the reactants dispersed in a substantially anhydrous inert organic liquid.

10. A method of making a polymer consisting essentially of polymerized vinylbenzyl thiol which method comprises hydrolyzing polymerized vinylbenzyl acetate by heating the polymer at temperatures between 50° and 120° C. in admixture with an alkali metal hydroxide while having the reactants dispersed in a substantially anhydrous saturated lower aliphatic alcohol containing from 1 to 4 carbon atoms in the molecule.

11. A polymer comprising vinylbenzyl thiol chemically combined in the polymer molecule.

12. A polymer consisting essentially of vinylbenzyl thiol chemically combined in the polymer molecule.

References Cited in the file of this patent

UNITED STATES PATENTS

| | | |
|---|---|---|
| 2,259,869 | Allen | Oct. 21, 1941 |
| 2,378,535 | Brubaker | June 19, 1945 |

OTHER REFERENCES

Brewster: Organic Chemistry, Prentice Hall (1955), pages 224–225.